United States Patent [19]
Remboski, Jr. et al.

[11] Patent Number: 5,387,253
[45] Date of Patent: Feb. 7, 1995

[54] SPECTRAL MISFIRE DETECTION SYSTEM AND METHOD THEREFOR

[75] Inventors: Donald J. Remboski, Jr., Dearborn; Kevin J. Bush, Northville; John F. Foley, Novi; David Frankowski, Woodhaven; Steven L. Plee, Brighton, all of Mich.

[73] Assignee: Motorola, Inc., Schaumburg, Ill.

[21] Appl. No.: 997,431

[22] Filed: Dec. 28, 1992

[51] Int. Cl.$^6$ .......................................... G01M 15/00
[52] U.S. Cl. .................................................. 73/117.3
[58] Field of Search ...................... 73/116, 117.3, 115; 364/431.07, 431.08; 123/419, 436, 676

[56] References Cited

U.S. PATENT DOCUMENTS

| | | |
|---|---|---|
| 3,908,366 | 9/1975 | Masaki . |
| 3,924,457 | 12/1975 | Oshima et al. . |
| 4,083,234 | 4/1978 | Aono et al. . |
| 4,357,662 | 11/1982 | Schira et al. . |
| 4,372,269 | 2/1983 | Coles . |
| 4,380,800 | 4/1983 | Wilkinson . |
| 4,424,709 | 1/1984 | Meier, Jr. et al. ................. 73/115 |
| 4,438,647 | 3/1984 | Ozaki et al. . |
| 4,697,561 | 10/1987 | Citron . |
| 4,766,863 | 8/1988 | Fujimori . |
| 4,932,379 | 6/1990 | Tang et al. . |
| 4,936,277 | 6/1990 | Deutsch et al. . |
| 5,044,194 | 9/1991 | James et al. . |
| 5,044,195 | 9/1991 | James et al. . |
| 5,076,098 | 12/1991 | Miwa . |
| 5,088,318 | 2/1992 | Osawa . |
| 5,095,742 | 3/1992 | James et al. . |
| 5,105,181 | 4/1992 | Ross . |
| 5,109,695 | 5/1992 | James et al. . |
| 5,200,899 | 4/1993 | Ribbens et al. ................. 73/117.3 |
| 5,239,473 | 8/1993 | Ribbens et al. ................. 364/431.08 |

FOREIGN PATENT DOCUMENTS

| | | |
|---|---|---|
| 4002208A1 | 8/1991 | Germany . |
| 4131383A1 | 3/1992 | Germany . |
| 4208131A1 | 3/1992 | Germany . |
| WO90/02871 | 3/1990 | WIPO . |
| WO91/11599 | 8/1991 | WIPO . |

OTHER PUBLICATIONS

Methods of On-Board Misfire Detection; Gunther Plapp, Martin Klenk, Winfried Moser, Robert Bosch GmbH, 900232.

Diagnosis of Individual Cylinder Misfires by Signature Analysis of A Pcrankshaft Speed Fluctuations; G. Rizzoni, University of Michigan Vehicular Electronics Lab, Copyright 1989 Society of Automotive Engineers, Inc. 890884.

SAE the Engineering Resource for Advancing Mobility, International Congress and Exposition Detroit, Mich. Feb. 24-28, 1986, 860028.

Digital Filters; Analysis and Design, Copyright 1979 by McGraw-Hill, Inc. Library of Congress Cataloging in Publication Data.

*Primary Examiner*—Robert Raevis
*Attorney, Agent, or Firm*—Nicholas C. Hopman

[57] ABSTRACT

A system, and corresponding method, for detecting the presence of a misfire condition by interpreting spectral activity of a running engine includes a device (309, 313) for measuring a characteristic, preferably an acceleration characteristic indicative of the running engine's performance, A spectral discrimination device (319), preferably a digital filter, receives a composite signal (317) provided by the measuring device (309, 313). The digital filter (319) provides a normal firing signal (321), corresponding to spectral energy attributable to a portion of the composite signal (317) representative of a normal firing condition in the running engine, and a misfire signal (323), corresponding to spectral energy attributable to another portion of the composite signal (317) representative of a misfiring condition in the running engine. A comparison device (325) provides and indication of a misfire condition (327) when a magnitude of the misfire signal (323) exceeds a magnitude of the normal firing signal (321).

32 Claims, 7 Drawing Sheets

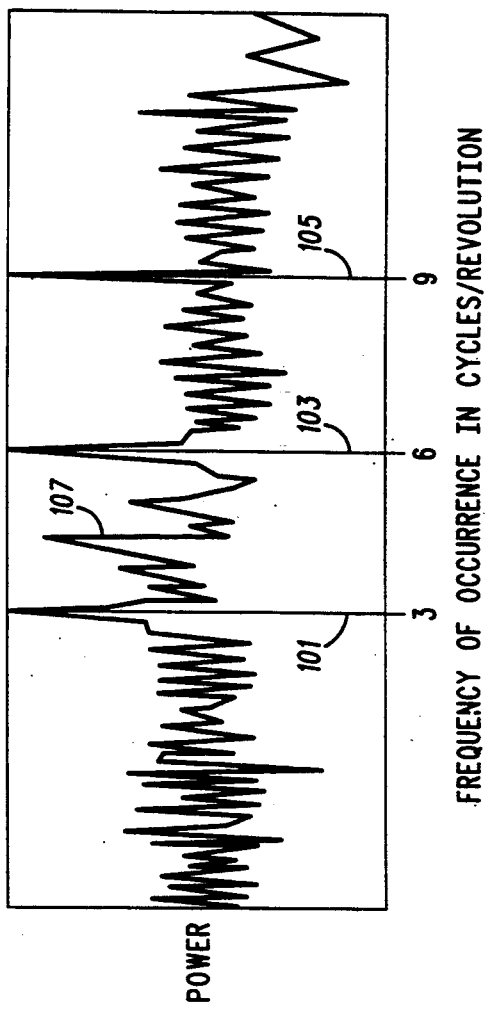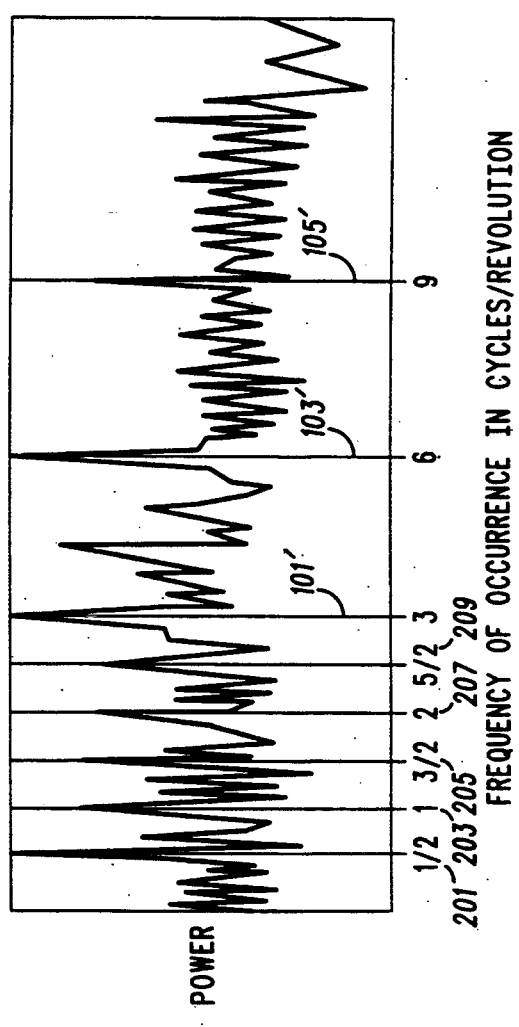

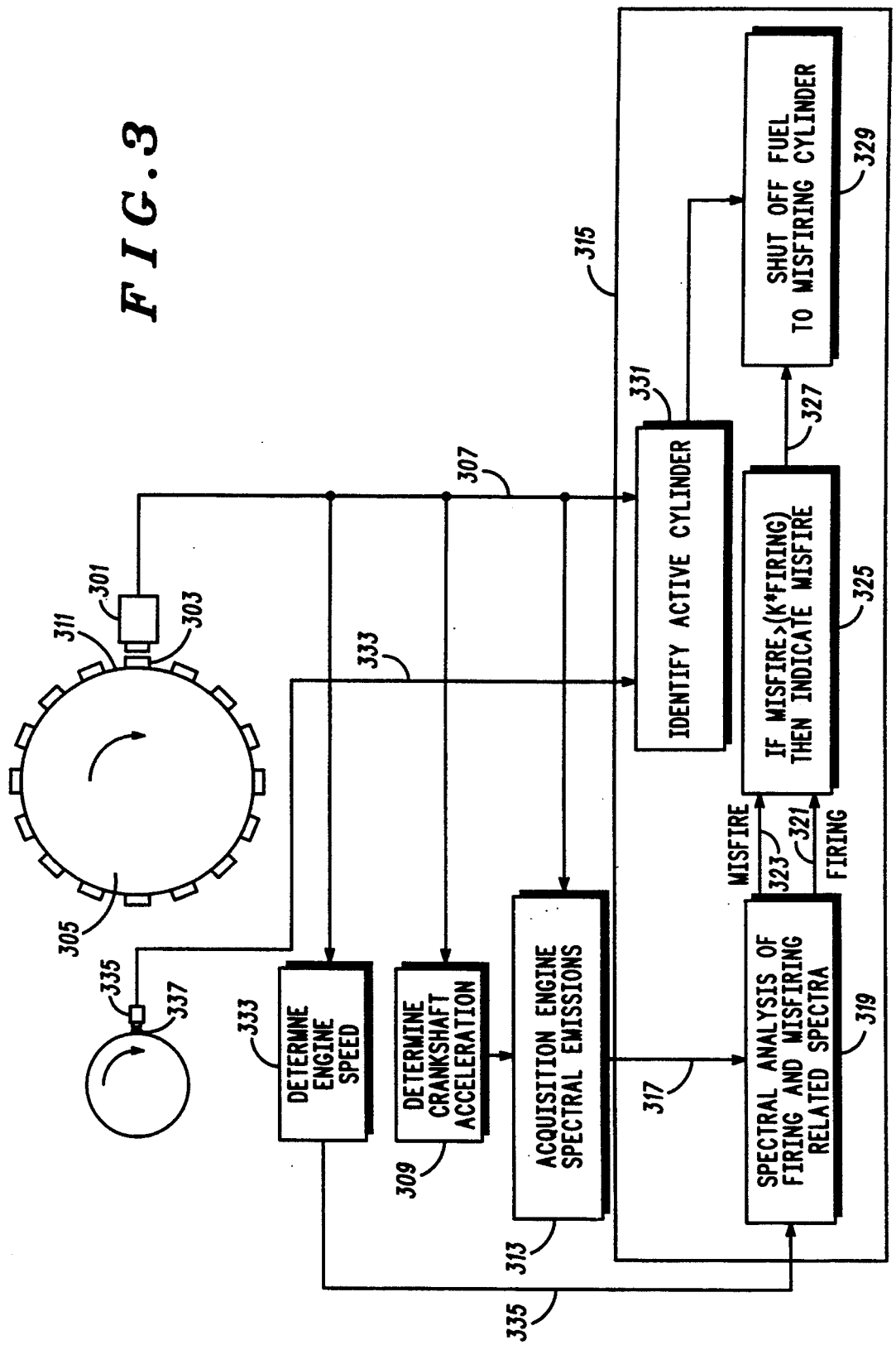

SPECTRAL MISFIRE DETECTION SYSTEM AND METHOD THEREFOR

FIELD OF THE INVENTION

This invention is related to the field of misfire detection within an internal combustion engine, and more specifically to a method, and corresponding apparatus, for determining misfire during a combustion event in an engine by interpreting spectral activity of a running engine.

BACKGROUND OF THE INVENTION

Various systems are employed on engines for detecting a misfire of a combustion event. If a cylinder repeatedly misfires, fuel is typically shut off to that cylinder. This prevents the passage of a large amounts of unburned fuel to an exhaust catalyst. This is done to prevent degradation of the catalyst's performance and useful life.

One type of system is coupled to an ignition system for detecting ignition related misfires. This scheme is deficient because it can only detect ignition related misfiring conditions which are a subset of the possible misfiring conditions and therefore lack the full function necessary to accurately determine misfire over a broad range of operating conditions.

Another scheme is to measure a temperature of the exhaust gas stream from an engine. Also, the content of carbon monoxide and hydrocarbons may be sensed to determine a misfire condition. Both of these schemes are plagued by slow response speeds of the sensory systems and the limited durability of the sensors in the hostile automotive environment.

Another scheme monitors average angular velocity of an engine's crankshaft. A signature analysis is performed on this average engine crankshaft velocity in an attempt to predict a misfire condition. Other schemes rely on measuring average engine crankshaft acceleration. Both of these schemes suffer from inaccuracy because they rely on multicombustion cycle averaging. This is problematic because these schemes are inaccurate and unreliable during transient operating conditions and other conditions with strong combustion variability. Combustion variability comes in many forms including crankshaft torsional effects, due to the resonant characteristics of the crankshaft, and effects of various engine accessories such as an alternator, an air conditioner compressor, a fan etc.

Additionally, the misfire component of the sensed signal varies considerably in magnitude and frequency over the full operating range of the engine. Since averaging schemes rely on predicting a change from a steady state condition they inherently loose accuracy under these transient operating conditions. Also, non-combustion related effects are substantial. These effects are typically attributable to variations in engine load torque induced by reciprocating inertia torque, and crankshaft torsional vibration.

Another scheme is to measure a pressure or flow fluctuation in an exhaust path of a combustion chamber, through the employment of a pressure transducer. Through signature analysis, an output of this pressure transducer is compared to a predetermined signal, for detecting a misfire condition.

Other systems have considered analysis of audio output from an engine. It relies on analyzing the engine firing performance by coupling an audio sensor to an output of an exhaust system for measuring a frequency spectrum of exhaust noises.

This scheme, and the former exhaust measurement scheme, also have many deficiencies. For instance, it is substantially dependent on the characteristics of the coupling medium, in this case the exhaust system. The exhaust system, includes an exhaust manifold, coupled to an exhaust tube, that is coupled to a catalytic converter, that is coupled to a muffler, that is coupled to an exhaust pipe. Because of this structure, this arrangement is susceptive to interference from non-engine performance related audio noise sources including engine and vehicle vibrations that are coupled into the exhaust system. A resonance of this coupling medium may add to the harmonic spectra provided by the engine. Also, because of its large volumetric size, the exhaust system acts like a low pass filter that reduces the available signal thus effecting the accuracy of the measurement. Additionally, the propagation time of audio output from the engine will change as the exhaust system heats up, or cools down. Further, accuracy under transient engine operating conditions will be impaired by the time lag associated with the length of the exhaust system. Because of this, engine synchronous tuning cannot be guaranteed. Also, the length that the individual cylinder audio output traverses varies with each cylinder because of the different exhaust runner lengths of the exhaust manifold. This will cause a variable delay from when the exhaust valve opens to when it is sensed. This variable length coupling from each cylinder to the sensory means may also shift the harmonic spectra provided by the engine. This is because of the pressure wave reflections that are caused by the different amount of time a pressure pulse will take to travel from an exhaust valve to the audio sensor in different cylinders. Further, an engine's exhaust system is tuned for optimal engine performance. By using this scheme, this tuning is more complex because of the additional concern of providing for an audio sensor in the tuning path. Also the audio sensor has durability limitations.

In summary, prior art misfire detection schemes are inaccurate, slow to respond to transient engine operating conditions, and incomplete in their ability to sense a broad scope of misfire conditions possible in an operating engine.

What is needed is an improved system for detecting misfire in internal combustion engines that is accurate, able to respond to transient engine operating conditions, able to sense a broad scope of misfire conditions possible in an operating engine, requires minimum calibration, and can be easily applied to different engine families.

BRIEF DESCRIPTION OF THE DRAWINGS

FIG. 1 is a chart illustrating an engine firing spectra attributable to a normal firing condition with all cylinders firing as designed;

FIG. 2 is a chart illustrating an engine firing spectra attributable to a misfiring condition with one cylinder not firing as designed;

FIG. 3 is a system block diagram of a misfire detection system, as described in a preferred embodiment;

DETAILED DESCRIPTION OF A PREFERRED EMBODIMENT

Figure 4:
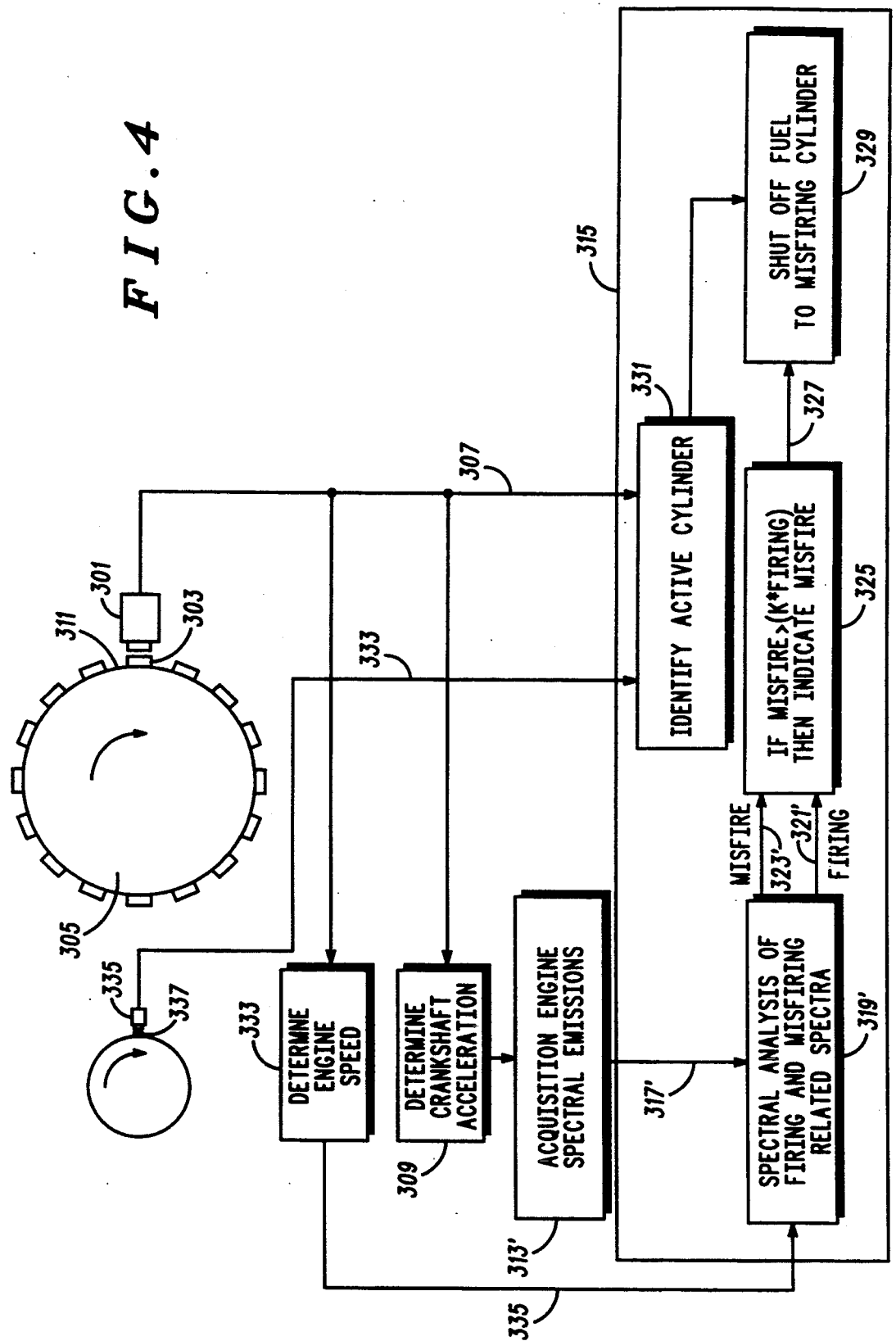
FIG. 4 is a system block diagram of a misfire detection system, as described in an alternative embodiment including an engine speed responsive spectral analysis means.

In a preferred embodiment, a system for detecting the presence of a misfire condition by monitoring spectral activity of a running engine is described.

In the preferred embodiment a spectra related to a characteristic, preferably an acceleration characteristic, indicative of performance of a combustion process, of a running engine is considered. Many diverse means for measuring this characteristic will yield suitable information for determining a misfire condition. For instance, means for measuring engine vibration with an accelerometer, optical means, ionization means, pressure means for measuring an in-cylinder combustion phenomena, or means for measuring motion all associated with an acceleration characteristic indicative of a combustion process are useful. Those skilled in the art will recognize other similar means and methods that can be substituted for these means without departing from the intent of this disclosure.

The charts of FIG. 1 and FIG. 2 illustrate the acceleration spectral behavior in a cycles/revolution domain indicative of the combustion performance of a running engine. Note that representation in the cycles/revolution domain is convenient because acceleration fluctuations due to combustion, engine imbalance, and engine accessories (such as an alternator, an air conditioner compressor, a fan etc.) remain at the same cycles/revolution occurrence frequency regardless of engine speed.

In FIG. 1 an engine firing spectra attributable to a normal firing condition of a four stroke six cylinder engine is shown. Note that the power of the acceleration fluctuations is particularly prominent at a series starting at 3 101, 6 103, and 9 105 cycles/revolution. Although higher order harmonics, or partials, are in the series they are insignificant compared to systemic noise. Also note a strong response shown by reference number 107. This represents a spectral response directly resulting from a crankshaft torsional effect. Note that the normal firing spectral phenomena is independent of engine speed in the cycles/revolution domain, and the torsional vibration spectra is variable in the cycles/revolution domain given that the torsional vibration has a constant frequency behavior.

FIG. 2 shows an engine firing spectra attributable to a misfiring condition with one cylinder not firing. Note that power is still particularly prominent at a series starting at 3 101', 6 103', and 9 105' cycles/revolution but also at 1/2 201, 1 203, 3/2 205, 2 207, and 5/2 209 cycles/revolution. This sub-harmonic series behavior is indicative of only one cylinder misfiring. If a pair of cylinders misfires, predominant energy would appear at a series starting with 1 and 2 cycles/revolution. This behavior is fairly common, and is attributable to a failure of a shared ignition coil, typically found in contemporary ignition systems.

Of course, in engine arrangements with a different number of cylinders, a misfiring ignition pair would have a different but similarly predictable spectral behavior. Additionally, in non-even firing engines the spectral behavior of the acceleration characteristic would have a correspondingly predictable spectral behavior.

The fundamental, or lowest order firing frequency for all engines, either two stroke or four stroke is representable by the following relationship:

$$f = \frac{360}{\Delta\theta} \text{ (cycles/revolution)}$$

where:

360 = degrees/revolution and for even firing engines: $\Delta\theta$ = number of degrees between cylinder firings and for uneven firing engines: $\Delta\theta$ = number of degrees between a repeat in the firing pattern The fundamental, or lowest order misfire frequency for all even firing engines, is representable by the following relationship:

$$f_{2\text{-}stroke} = 1 \text{ cycle/revolution}$$

$$f_{4\text{-}stroke} = \tfrac{1}{2} \text{ cycle/revolution}$$

The complete series for the spectral relationship presented above can be approximated deterministically as follows. The torque on the engine crankshaft due to gas pressure for a single cylinder engine can be approximated by the following equation:

$$\frac{T_p}{T_m} = 1 + \sum_{n=1/2,1,3/2,2,\ldots}^{\infty} W_n \sin(n\theta + \phi_n)$$

where:

$T_p$ = instantaneous pressure torque $T_m$ = mean torque of the engine $W_n, \phi_n$ = coefficients that vary with engine type and operating conditions n = harmonic order $\theta$ = engine rotational position For a typical four stroke engine with an even firing interval, the torque vectors add when n is a multiple of the number of cylinders divided by two, and cancel for all other values of n under normal operating conditions. However, as displayed in FIG. 2, and mentioned earlier, when a single cylinder misfires, all of the lower orders (n = $\tfrac{1}{2}$, 1, 3/2, 2, . . . ) are present in addition to the normal firing order. When a misfire occurs in pairs on opposite strokes in the firing order, only the higher orders are present, as mentioned earlier. Thus, misfire detection can be accomplished by observing the spectral presence of the series n = $\tfrac{1}{2}$, 1, 3/2, 2, . . . This will be valid at all engine loads and speeds.

A chart illustrating characteristic frequencies for a four stroke, even firing engine for different cylinder arrangements, is provided as follows:

TABLE 1

| No. of cylinders | firing frequencies | additional frequencies (below firing) | |
|---|---|---|---|
| | | 1 cylinder misfire | misfire ignition pair |
| 4 | n = 2,4,6, ... | n = 1/2,1,3/2, ... | n = 1 |
| 6 | n = 3,6,9, ... | n = 1/2,1,3/2, ... | n = 1,2 |
| 8 | n = 4,8,12, ... | n = 1/2,1,3/2, ... | n = 1,2,3 | where n = cycles/revolution

Thus, spectra resulting from a misfiring condition will be located a fixed spectral distance below the spectra associated with a normal firing condition.

A system for recognizing the aforementioned behavior includes a spectral sensing means, coupled to a running engine, for providing a spectral signal representative of the spectral activity of the running engine, indicative of the engine's performance. In the preferred embodiment a crankshaft position sensor is used to measure angular displacement, and is then conditioned to provide a composite signal representative of crankshaft acceleration. Other embodiments, detailed later, will include other sensing mechanisms for measuring motion associated with an acceleration characteristic, indicative of performance of the combustion process of the running engine.

A spectral discrimination means receives the composite signal provided by the measurement means, and provides a normal firing signal that corresponds to spectral energy attributable to a portion of the composite signal representative of a normal firing condition. If a misfiring condition exists, the spectral discrimination means further provides a misfire signal, corresponding to spectral energy attributable to another portion of the composite signal representative of the misfiring condition of the running engine. Then a misfire indication is provided if a magnitude of the misfire signal exceeds a magnitude of the firing signal by a predetermined factor.

FIG. 3 shows a system block diagram of a misfire detection system that applies this behavior recognition strategy to render improved detection of a misfire condition in a running engine. In the preferred embodiment a six cylinder, 4 stroke engine is used. In the preferred embodiment, a central element for detecting a misfire condition is implemented using discrete time signal processing elements.

Alternatively, those skilled in the art will recognize other equivalent embodiments such as those using conventional continuous time signal processing elements, including conventional analog circuits. Discrete time signal processing was chosen because of the benefits it has over continuous time signal processing elements. These benefits include fewer components, stable deterministic performance, no aging, no drift, no adjustments, easily tunable for various engines, high noise immunity, and self test capability.

As mentioned earlier, a crankshaft displacement sensor is used to measure angular displacement, which is then conditioned to provide a composite signal representative of crankshaft acceleration due to the performance of the combustion process in the running engine. To accomplish this measurement, in FIG. 3 a sensor 301 measures a passing tooth 303 on a rotating wheel 305, that is attached to a running engine's crankshaft. This practice of using a toothed wheel on a crankshaft is commonplace in the field of engine control. Of course, those skilled in the art will recognize many other, substantially equivalent, means and methods to measure angular displacement. An engine angular displacement signal 307 is provided by the sensor 301. In the preferred embodiment, as the engine runs, the angular displacement signal 307 is typically a logic level signal that transitions when the sensor 301 senses the tooth 303 and a subsequent space 311. Therefore, as the toothed wheel 305 rotates, responsive to the combustion process in the running engine, the angular displacement signal 307 is substantially a rectangular waveform responsive to angular velocity, or engine speed.

This angular displacement signal 307 is provided to element 309. Element 309 determines an acceleration of the running engine's crankshaft. Those skilled in the art will recognize several means and methods for doing this. In the preferred embodiment, elapsed time intervals between adjacent transitions of the rectangular wave 307 are compared to determine crankshaft acceleration. It is preferable to filter this determined acceleration to remove any torsional vibrations or other acceleration effects not related to misfire behavior. This is described later.

The acceleration information is then provided to element 313. In the preferred embodiment, element 313 samples the acceleration information synchronous with engine angular displacement. As mentioned earlier the spectral phenomena of the acceleration information of interest, that is for detecting engine firing and misfiring spectra, is independent of engine speed, if engine synchronous sampling is used. Thus, in this embodiment, element 313 is simply a gate controlled by the angular displacement signal 307. Element 313 outputs, a composite signal, or acquisitioned engine crankshaft acceleration signal 317, representative of engine spectral emissions related to the combustion performance of the running engine.

As mentioned earlier, the preferred embodiment relies on discrete time signal processing elements. Element 315 represents a Digital Signal Processor, or DSP. The constituent system level block diagram elements illustrated within element 315 represent hardware means microcoded with appropriate software routines. In this case a Motorola DSP56001 315 device is used. The Motorola DSP56001 has the capability of executing over ten million instructions per second, and with 24 bit wide data paths provides 144 dB of dynamic range. Of course, those skilled in the art will recognize other equivalently useful DSP devices, or hardwired, or other microcoded approaches that have substantially the same function.

The key element of this implementation includes a digital filter, represented by element 319. This filter is comprised of three separate filters as detailed in FIG. 7.

Figure 7:
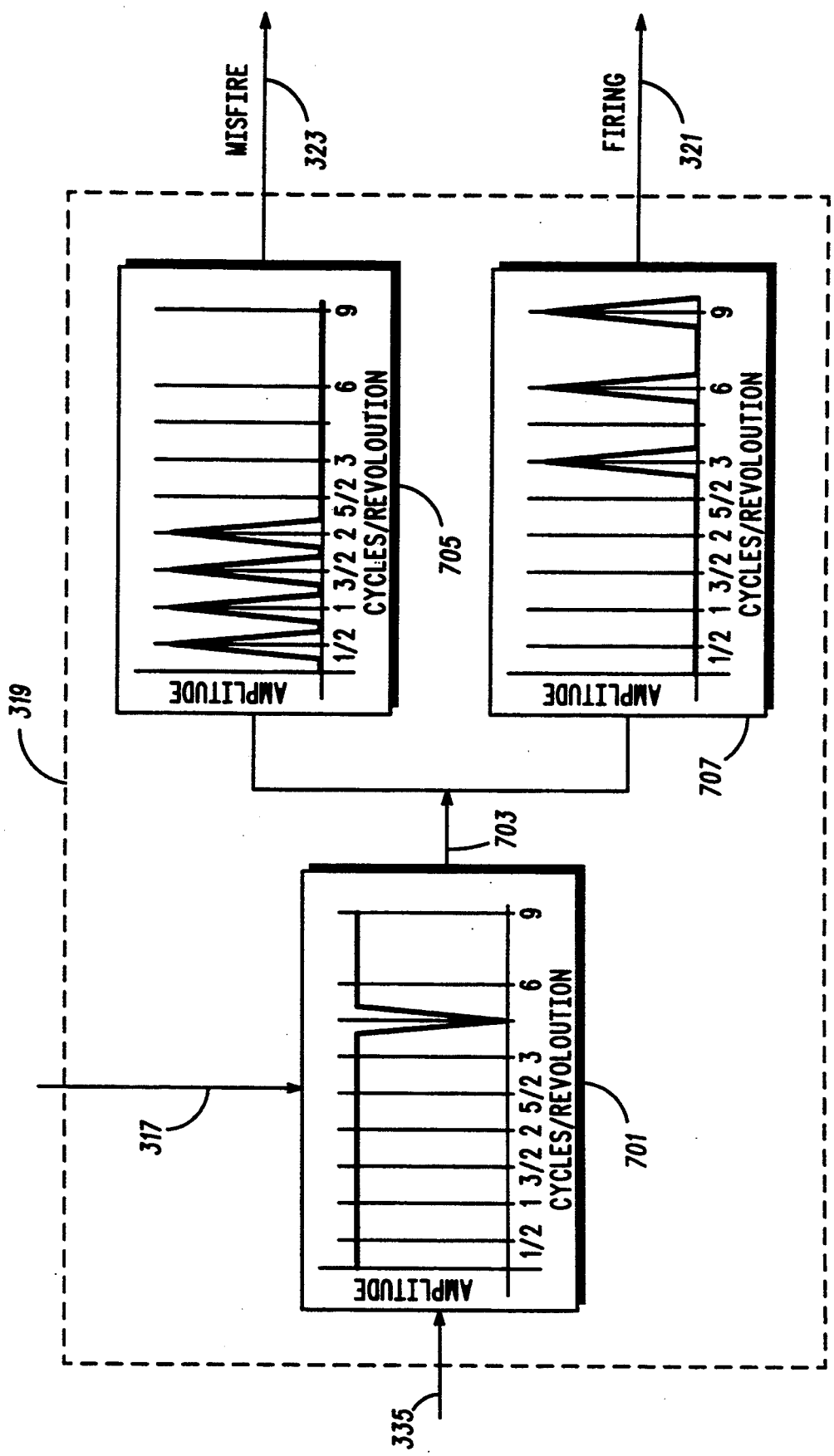
FIG. 7 is a system block diagram of digital filters used in the preferred, and alternative embodiments for extracting, torsional crankshaft vibrations, firing related spectra, and misfiring related spectra all in the cycles/revolution domain.

Referring to FIG. 7 this filter 319 includes a noise filtering means, or a notch filter 701 located to eliminate any effect from the crankshaft torsional spectral element. This noise filtering means 701, or noise spectral discrimination means, receives a composite spectral signal, in this case the acquisitioned engine crankshaft acceleration signal 317, and provides a noise filtered signal 703 absent of a predetermined noise component of the composite spectral signal. In this case the predetermined noise component is the crankshaft torsional vibration. Because the cycles/revolution domain is used in this embodiment, and the torsional vibration spectral element is constant in the frequency domain, this filter 701 must be tuned synchronous with engine speed. To this end, element 333 determines engine speed and provides an output variable 335 corresponding to the speed of the engine crankshaft measurement apparatus 301, 303, 305, 311, 307.

The tuning of filter 701 is accomplished by deriving variable filter coefficients that correspond to the engine speed. This is particularly convenient in the Motorola DSP56001 and is accomplished by the use of a lookup table with alternative filter coefficients. Alternatively, recalculation of the filter coefficients may be used to, in effect, tune the filter 701 responsive to the signal 335 indicative of engine speed. Also, those skilled in the art will recognize the method of re-sampling the data into the frequency domain, applying a fixed filter, and re-sampling into the cycles/revolution domain as another alternative. The filter 701 provides the noise filtered signal 703 to both a firing filter bank 707, and misfiring filter bank 705.

As noted above for the notch filter 701, filters 705 and 707 are also designed to consider spectral energy in the cycles/revolution domain. In other embodiments, some described herein, these filters 701, 705, and 707 are designed to operate on data in the frequency domain.

The firing filter bank 707 is designed to extract spectral energy expected from the noise filtered signal 703 related to normal firing at 3, 6, and 9 cycles/revolution. Alternatively, if lesser accuracy is needed, the firing filter bank 707 can directly extract spectral energy expected from the composite spectral signal 317. The firing filter bank 707 provides a normal firing signal 321 corresponding to spectral energy, or power attributable to a portion of the noise filtered signal 703 representative of energy caused by a normal firing condition in the running engine.

The misfiring filter bank 705 is designed to extract spectral energy expected from the noise filtered signal 703 related to misfiring at $\frac{1}{2}$, 1, 3/2, 2, and 5/2 cycles/revolution. It provides a misfire signal 323, corresponding to spectral energy attributable to another portion of the composite signal representative of a misfiring condition in the running engine.

Note that in the preferred embodiment a six cylinder, 4 stroke engine is used. If another engine configuration is used the proper spectral relationships are shown in Table 1.

Of course, those skilled in the art will recognize other uses for the notch filter 701, including the elimination of other unwanted systemic noise, such as that due to force imbalances, road related disturbances, and engine accessory related noise. To filter out some of these other phenomena, multiple notches, or differently tuned rejection bands, may be used.

The digital filters 701, 705, 707 are implemented as Finite Impulse Response, or FIR filters. Alternatively Infinite Impulse Response, or IIR filters may be used. A substantial amount of excellent contemporary literature is available on the subject of digital filter design. This includes a text book published by McGraw-Hill Inc., in 1979, and authored by Andreas Antoniou, entitled DIGITAL FILTERS: ANALYSIS AND DESIGN. Another excellent reference published by Prentice Hall Inc., 1990, is entitled DIGITAL SIGNAL PROCESSING IN VLSI. In the embodiments described herein the DSP56001 315 is programmed to implement these digital filters. FIR filters are very commonly designed using this DSP 315.

In the preferred embodiment, and some of the others described later, the fact that the spectral phenomena of interest is independent of engine speed in the cycles/revolution domain makes it convenient to apply engine synchronous sampling. To do this, the digital filter coefficients, for normal firing at 3, 6, and 9 cycles/revolution, and for misfiring at $\frac{1}{2}$, 1, 3/2, 2, and 5/2 cycles/revolution are specified in terms of the sampling, or data, rate in accordance with the Nyquist Theorem in the cycles/revolution domain. Therefore, because the digital filters' coefficients have a fixed relationship to the sampling rate, as the engine changes speed, since the phenomena of interest remains constant in the cycles/revolution domain the filters 701, 705, 707, in effect, track.

After filtering, the normal firing signal 321 and the misfire signal 323 are provided from the digital filters 705 and 707 to element 325. Element 325 provides a misfire indication signal 327 when a magnitude of the misfire signal 323 exceeds a magnitude of the firing signal 321 by a predetermined factor. This predetermined factor is preferably adjustable for different engine families.

The misfire indication signal 327 is preferably provided to element 329 which shuts off the fuel delivery to the misfiring cylinder. The misfire indication signal 327 may also be provided outside this system for reporting a misfire condition to another engine controller, or diagnostic apparatus.

To identify the particular cylinder coincident with the misfire indication signal 327, element 331 is provided. Element 331 considers the angular displacement signal 307 and a TDC marker signal 333 to compute the cylinder currently in the combustion process. Another sensor 335 and tooth 337 are attached to a camshaft of the engine and used to provide the TDC, or cylinder identification, marker signal 333. Many apparatus and methods of identifying and disabling a misfiring cylinder, once the difficult task of accurately identifying misfire is complete, is well known to those skilled in the art of engine design.

Note that with the approach described in the preferred embodiment the acceleration characteristic measured, associated with firing and misfiring combustion performance, is independent of measurement path length between the running engine, exemplified by the toothed wheel 305 and the sensory system, represented by the sensor 301. This is also true in a multiple cylinder design. This is a substantial advantage over some prior art systems. Additionally, having free space as a coupling media asserts no load on the engine and has no substantial effect on the characteristic measured, as in prior art systems that relied on a necessarily burdensome coupling medium.

The elegance of this embodiment includes a fixed, stable spectral discrimination means that relies on an input data rate, or sample rate directly derived by engine speed. This engine synchronous sampling approach is not possible with a tuned analog filter implementation used in prior art, but is convenient with a digital filter. Also, since a single point in the engine is used to measure the combustion performance, the measurement is independent of measurement path length and geometry, thus no measurement path coupling or multi-path errors are introduced as in the prior art.

Other embodiments are shown in FIG.'s 4, 5, and 6. In FIG. 4 the same crankshaft sensory system is employed with digital filters associated with the frequency domain, rather than the cycles/revolution domain.

Element 313' inputs the crankshaft acceleration information provided by element 309 at a fixed sampling rate. Of course, this fixed sampling speed is chosen to be high enough to conform to the Nyquist Theorem requirements to ensure that aliasing does not occur. Element 313' is constructed using a gate controlled by a clocking oscillator, and provides an output 317' at a constant sample rate to element 319'.

Figure 8:
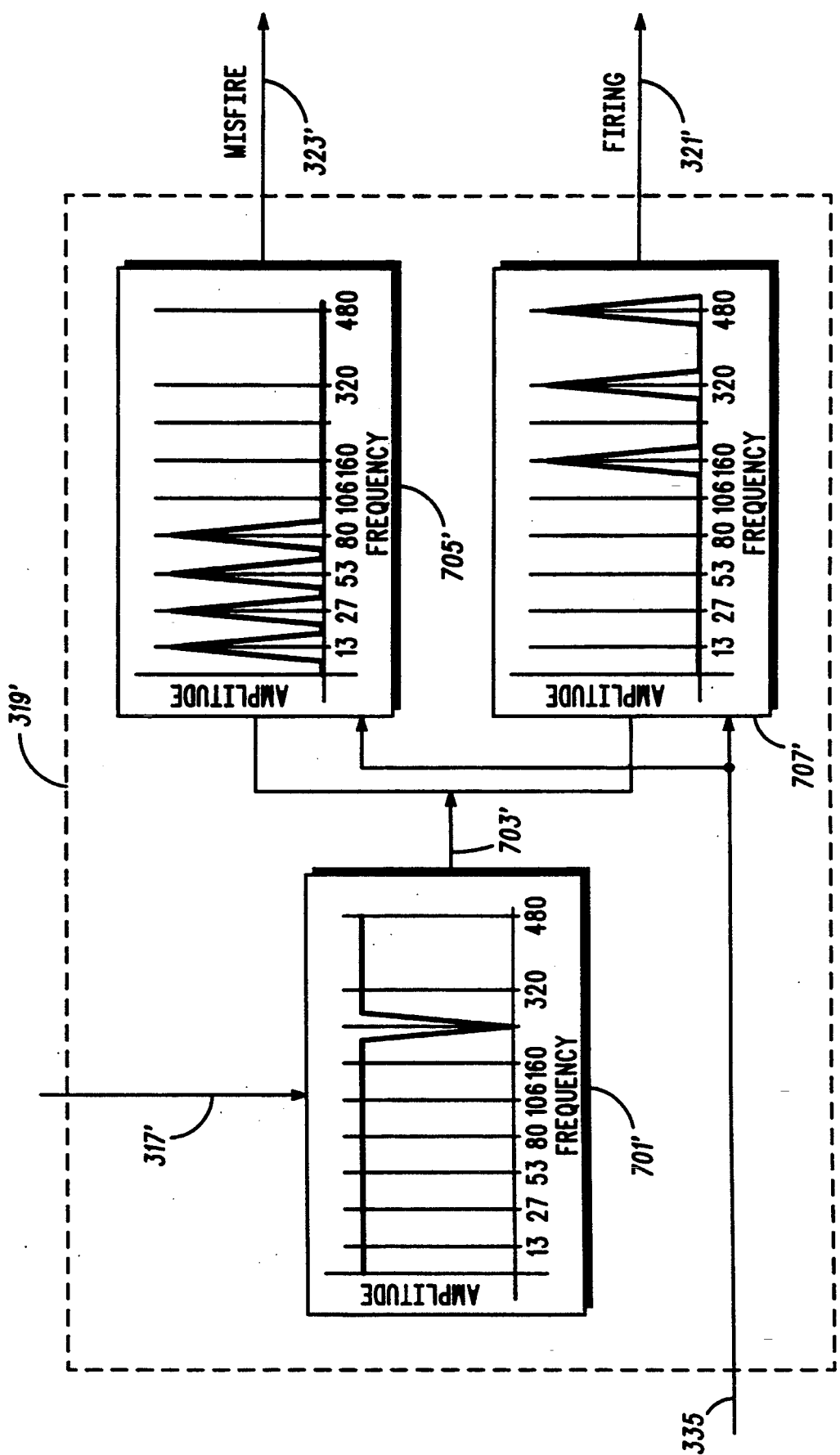
FIG. 8 is a system block diagram of digital filters used in alternative embodiments for extracting, torsional crankshaft vibrations, firing related spectra, and misfiring related spectra, all in the frequency domain.

Referring to FIG. 8 this filter 319' has substantially the same structure as found in the filter 319, detailed in FIG. 7. However, because this approach uses a fixed sampling rate, in time, the data, represented by 317', is in the frequency domain. Thus, the digital filter 701' can be stationary and the digital filters 705' and 707' must be tunable to track engine speed. This is because since the sampling rate is fixed, and the torsional vibration spectral phenomena is fixed in the frequency domain, digital filter 701' can be fixed. Also, the firing and misfiring spectral phenomena of interest does not remain constant in the frequency domain as it did in the preferred embodiment in the cycles/revolution domain, and therefore these filters 705', 707' must be tuned to track engine speed. In this embodiment the engine speed variable 335 is provided to tune filters 705' and 707'.

As described in the preferred embodiment, preferably, the filter 701' is designed as a notch filter, but here the filter coefficients are fixed and are specified in the frequency domain. Specifically, filter 701 is tuned fixed to 240 Hz which corresponds to 4.5 cycles/revolution at 3,210 RPM. Note that this filter remains stationary because the effective crankshaft torsional vibration effect is fixed in the frequency domain.

The output 703', or noise filtered signal, of this filter 701' provides the torsional vibration free signal to the other filters 705', and 707'.

Filter 707' is configured as a digital multiple bandpass filter having a response that discriminates a spectrum corresponding to frequencies representing 3, 6, and 9 cycles/revolution at a known engine speed. The digital filter's 707' coefficients are variable and are specified in the frequency domain. Specifically, filter 707' is tuned to 160 Hz, 320 Hz, and 480 Hz for an engine speed of 3,210 RPM. If the engine speed is reduced by 50% to 1,605 RPM then new filter coefficients are looked up as mentioned earlier, and the filter 707' is correspondingly tuned to 80 Hz, 160 Hz, and 240 Hz.

Filter 705' is also configured as a digital multiple bandpass filter having a response that discriminates a spectrum corresponding to frequencies representing misfiring at ½, 1, 3/2, 2, and 5/2 cycles/revolution. The digital filter's 705 coefficients are variable and are specified in the frequency domain. Specifically, filter 705 is tuned to 27 Hz, 53 Hz, 80 Hz, 106 Hz, and 160 Hz for an engine speed of 3,210 RPM. If the engine speed is reduced by 50% to 1,605 RPM then new filter coefficients are looked up, as mentioned earlier, and the filter 705 is correspondingly tuned to 13 Hz, 27 Hz, 40 Hz, 53 Hz, and 80 Hz.

Each of these filters, 707', and 705' output a signal 321' and 323' for indicating spectral energy located at a predicted firing frequencies and misfiring frequencies correspondingly. The other elements perform as described earlier in the discussion about FIG. 3.

Figure 5:
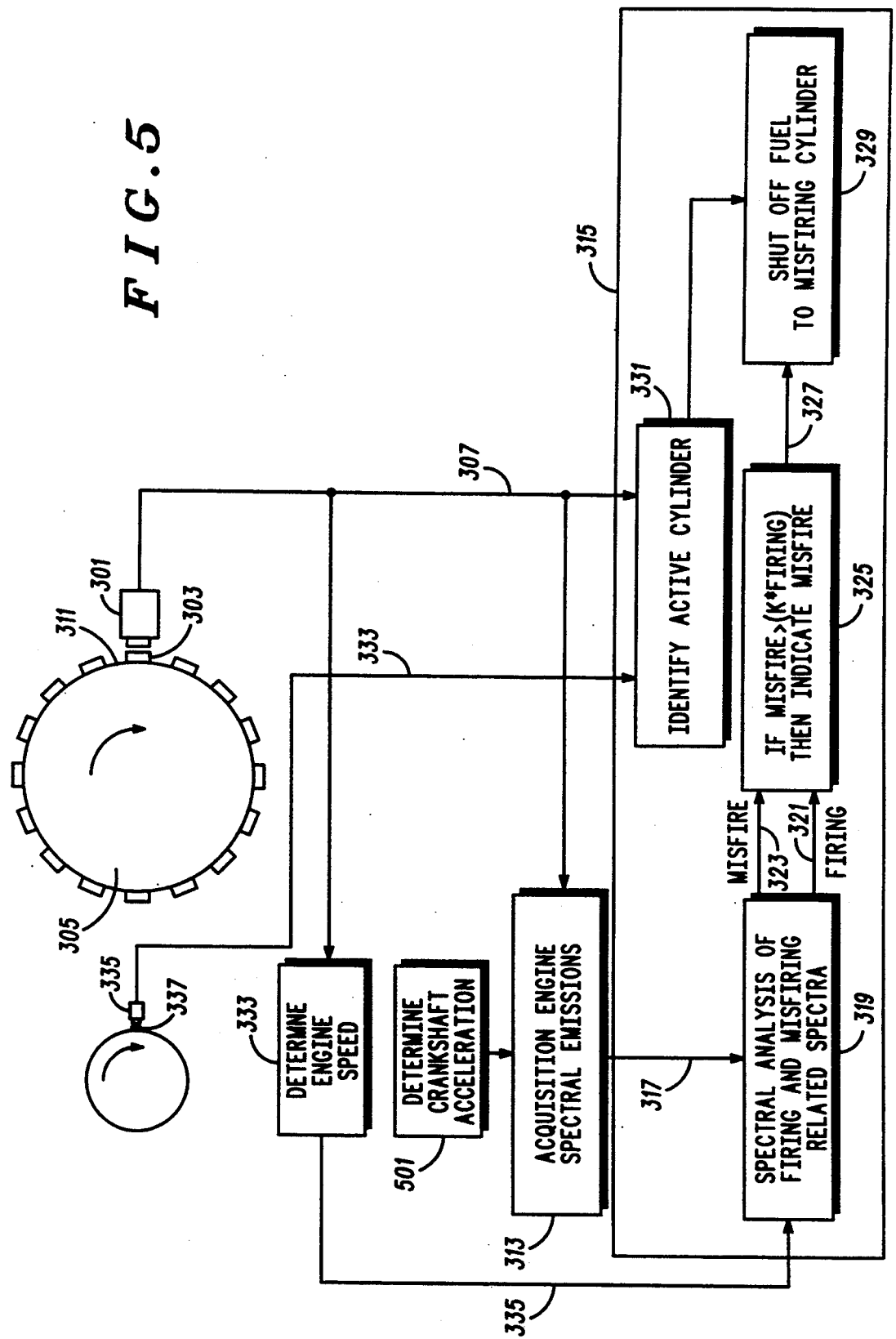
FIG. 5 is a system block diagram of a misfire detection system, as described in an alternative embodiment, including an engine mounted accelerometer.

In FIG. 5 an engine mounted accelerometer 501, conveniently the same one that may be used for knock detection, is employed to measure the combustion performance. Aside from the substitution of the sensory means this embodiment works the same as the preferred embodiment.

Although FIG. 5 is shown using the engine synchronous sampling approach common to measurement in the cycles/revolution domain the fixed sample rate, or frequency domain, approach may alternatively be applied. In addition to the earlier stated advantages, this approach shares a sensor with a to be provided knock detection function. This is significant to cost savings, factory installation and field repair ease and field reliability. Additionally, this approach is insensitive to crankshaft torsional vibrations.

Figure 6:
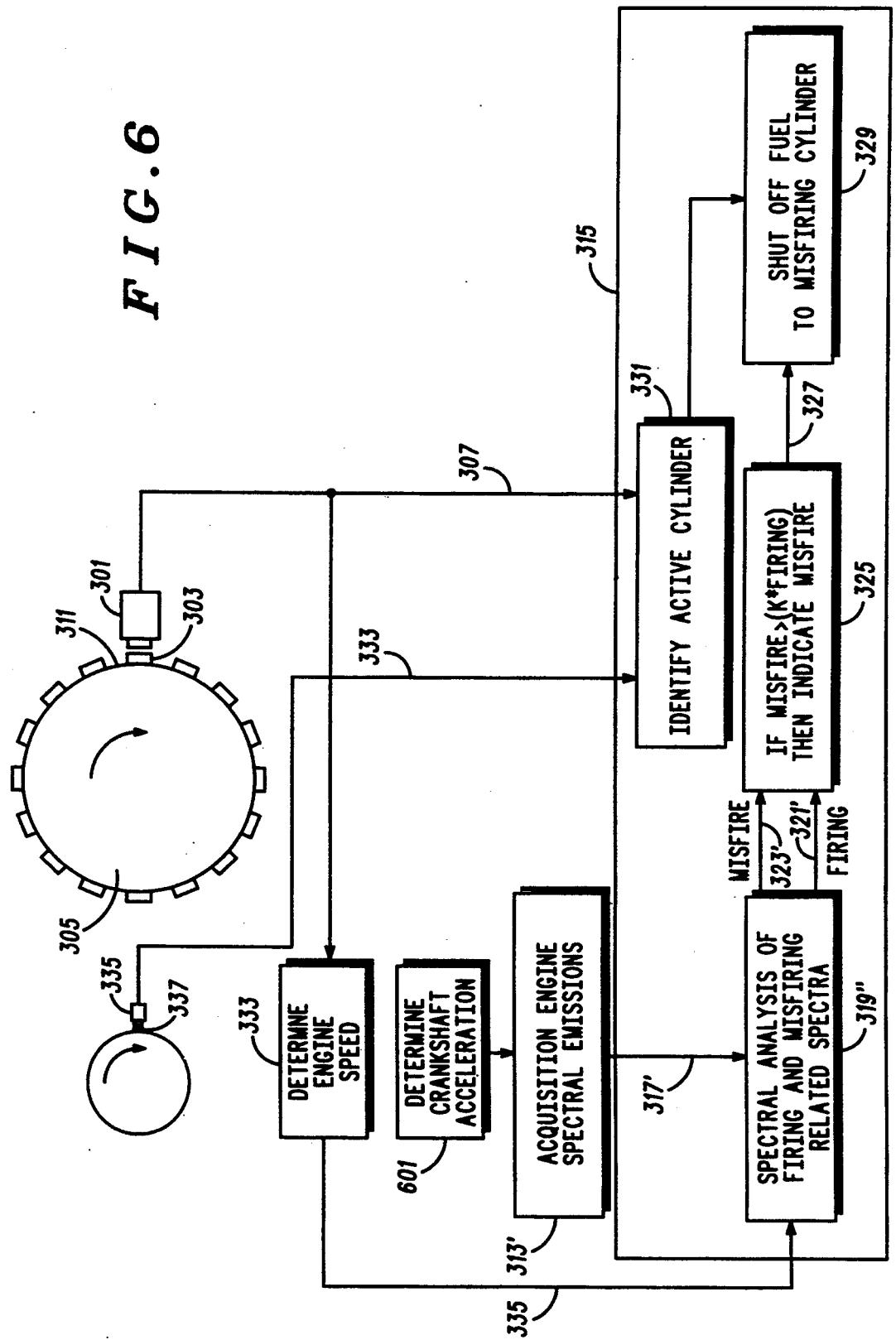
FIG. 6 is a system block diagram of a misfire detection system, as described in an alternative embodiment, including an in-cylinder sensor.

In FIG. 6 an in-cylinder sensor 601 is employed to measure the combustion performance. Various types of sensors can be employed. A subset of these include optical, pressure, and ionization sensors. Also, a sensor on each of the cylinders can be used. If sensors are provided on multiple cylinders then their outputs are preferably combined into the misfire detection system. Alternatively, the sensors may be individually analyzed. FIG. 6 shows the frequency domain approach.

Element 313' inputs combustion-information provided by the incylinder sensor, 601 at a fixed sampling rate. This element 313' is identical to the element described in FIG. 4. The sampled data 317' is provide to the filter 319' The filter 319' is designed to operate the same as the filter described in FIG. 4. The other elements perform as described earlier in the discussion about FIG. 3.

Alternatively, if the cylinders are individually analyzed, the digital filter is tuned to detect one-half cycles/revolution for a proper firing, and an absence of a firing, or significantly attenuated firing energy at one-half cycles/revolution indicates a misfire.

Of course, the engine synchronous sampling approach may alternatively be employed. In addition to the earlier stated advantages, this approach directly measures the combustion process and is not affected by the extraneous systemic noise sources, such as crankshaft torsional effects, that affect the other sensing techniques.

In conclusion, a system for detecting the presence of a misfire condition by monitoring spectral activity through measuring motion associated with an acceleration characteristic indicative of performance of a combustion process of a running engine, has been presented. The preferred and alternative embodiments overcome the significant disadvantages of the prior art. Improvements include a more accurate detection of a misfiring condition because the measurement path is direct, there is an improved insensitivity to external influences, a singular measurement path not effected by multi-path induced errors, and this approach avoids any inaccuracy due to multi-cycle averaging. This system is also more stable and the results more predictable, because of the digital filter implementation. Further, this approach is more responsive to transient engine operating conditions because no multi-cycle averaging is employed. This approach is also independent of energy emitted and does not pose a loading problem on the measured engine as prior art systems did. Because all engines exhibit the misfire behavior at the known spectra, this system requires minimum calibration, and can be easily applied to different engine families.

Although the embodiment proposed herein rely on a particular systemic approach, many other systems, and methods (with other apparatus) could be devised to yield the same advantages of this approach.

What is claimed is:

1. A system for detecting a misfire condition by interpreting acceleration activity of a running engine comprising:

means for measuring an acceleration of said running engine, and for providing a composite signal representative of said engine's acceleration;

acceleration discrimination means for receiving the composite signal provided by said means for measuring, and for providing a normal firing signal, corresponding to acceleration behavior attributable to a portion of the composite signal representative of a normal firing condition and, concurrent to the provision of the normal firing signal, for providing a misfire signal, corresponding to acceleration behavior attributable to another portion of the composite signal representative of a misfiring condition; and comparison means for receiving the normal firing signal and the misfire signal, both signals provided by said acceleration discrimination means, and for providing a misfire indication when a magnitude of the misfire signal exceeds a magnitude of the normal firing signal.

2. An apparatus in accordance with claim 1 wherein said means for measuring an acceleration comprises means for measuring engine angular acceleration corresponding to an angular displacement of said running engine.

3. An apparatus in accordance with claim 1 wherein said means for measuring an acceleration comprises means for measuring acceleration corresponding to vibration of said running engine.

4. An apparatus in accordance with claim 1 wherein said means for measuring an acceleration comprises means for measuring an in-cylinder combustion phenomena dependent on an acceleration behavior of said running engine.

5. An apparatus in accordance with claim 1 further comprising means for shutting off fuel to a cylinder, responsive to the provision of said misfire indication.

6. An apparatus in accordance with claim 1 wherein said acceleration discrimination means comprises a normal firing acceleration discrimination means responsive to spectral energy attributable to a portion of the composite signal representative of a normal firing condition, and a misfiring signal acceleration discrimination means responsive to spectral energy attributable to a portion of the composite signal representative of a misfiring condition, wherein said misfiring signal acceleration discrimination means is spectrally discriminatory a predetermined fixed spectral distance below said normal firing spectral discrimination means.

7. An apparatus in accordance with claim 6 wherein said misfiring signal spectral discrimination means comprises multiple spectral discrimination means predominantly responsive to frequencies located at one-half, one, and three-halves cycles/revolution of a predominant spectral location of the normal firing spectral discrimination means.

8. An apparatus in accordance with claim 7 further comprising:

means for providing a synchronization signal representative of said running engine's speed; and
wherein said means for measuring an acceleration of said running engine measures said acceleration at a sample rate responsive to the synchronization signal provided by said means for providing a synchronization signal.

9. An apparatus in accordance with claim 6 wherein a predominant spectral location of said acceleration discrimination means are tunable.

10. An apparatus in accordance with claim 9 further comprising:

means for providing a synchronization signal representative of said running engine's speed; and
wherein the predominant spectral location of said acceleration discrimination means is tuned responsive to the synchronization signal provided by said means for providing a synchronization signal.

11. An apparatus in accordance with claim 1 wherein said means for measuring an acceleration measures the acceleration independent of a measurement path length between a motion associated with the acceleration indicative of performance of a combustion process of said running engine and said means for measuring the acceleration.

12. An apparatus in accordance with claim 1 wherein said means for measuring an acceleration measures the acceleration independent of a measurement path length between said running engine and said means for measuring in a multiple cylinder engine.

13. An apparatus in accordance with claim 12 wherein a coupling media used by said means for measuring an acceleration asserts no load on the engine and has no substantial effect on the acceleration measured.

14. An apparatus for detecting a misfire condition by interpreting acceleration activity of a running engine comprising:

acceleration sensing means, coupled to said running engine, for providing a signal representative of said acceleration activity of said running engine and for providing a composite signal in response thereto;

acceleration discrimination means for receiving the composite signal provided by said acceleration sensing means, and for providing a normal firing signal, corresponding to acceleration behavior attributable to a portion of the composite signal representative of a normal firing condition, and, concurrent to the provision of the normal firing signal, for providing a misfire signal, corresponding to acceleration behavior attributable to another portion of the composite signal representative of a misfiring condition; and means for providing an indication of a misfire condition when a magnitude of the misfire signal exceeds a magnitude of the firing signal by a predetermined factor.

15. An apparatus in accordance with claim 14 wherein said acceleration sensing means comprises an accelerometer coupled to said running engine.

16. An apparatus in accordance with claim 14 wherein said acceleration sensing means comprises means for sensing an acceleration of a crankshaft coupled to said running engine.

17. An apparatus in accordance with claim 14 wherein said acceleration sensing means further comprises:

speed sensing means for providing a synchronization signal representative of said running engine's speed; and
wherein said acceleration discrimination means comprises a frequency tunable normal firing acceleration filtering means responsive to acceleration behavior attributable to a portion of the composite signal representative of a normal firing condition, and a frequency tunable misfiring signal acceleration filtering means responsive to acceleration behavior attributable to a portion of the composite signal representative of a misfiring condition, wherein said frequency tunable misfiring signal acceleration filtering means is spectrally located a predetermined fixed spectral distance below said frequency tunable normal firing acceleration filtering means and wherein both said frequency tunable normal firing acceleration filtering means, and said frequency tunable misfiring acceleration filtering means are spectrally tuned responsive to said synchronization signal provided by said speed sensing means.

18. An apparatus in accordance with claim 17 wherein said frequency tunable misfiring signal acceleration filtering means comprises multiple acceleration filtering means predominantly responsive to acceleration spectra located at one-half, one, and three-halves cycles/revolution of a predominant spectral location of the normal firing spectral discrimination means.

19. An apparatus for detecting the presence of a misfire condition by interpreting acceleration activity of a running engine comprising:
non-audio acceleration sensing means, coupled to said running engine, for providing an acceleration signal representative of said acceleration activity of said running engine;
speed sensing means for providing a synchronization signal representative of said running engine's speed;
firing signal tunable filter means for receiving the acceleration signal from said non-audio acceleration sensing means, and for providing a firing signal representative of a firing portion of the acceleration signal, wherein said firing signal tunable filter means is tuned responsive to the synchronization signal provided by said speed sensing means;
misfiring signal tunable filter means, located a fixed spectral distance below said firing signal tunable filter means, for receiving the acceleration signal from said non-audio acceleration sensing means, and concurrent to the provision of the normal firing signal for providing a misfiring signal representative of a misfiring portion of the acceleration signal, wherein said misfiring signal tunable filter means is tuned responsive to the synchronization signal provided by said speed sensing means; and
comparison means for providing an indication of a misfire condition when a magnitude of the misfire signal exceeds a magnitude of the firing signal.

20. An apparatus for detecting a misfire condition by interpreting acceleration of a running engine comprising:
means for sensing acceleration, coupled to said running engine, and for providing an acceleration signal dependent on the sensed acceleration comprising a fundamental frequency component, irrespective of engine firing conditions, and concurrent to the provision of the acceleration signal for providing an acceleration signal comprising fractional harmonics of the fundamental frequency component when a misfire occurs;
engine speed detection means for detecting the speed of the engine and for providing a signal representative of said running engine speed; and acceleration analyzing means, including comparison means, for analyzing the provided acceleration signal on dependent on the engine speed signal, thereby detecting misfire, if an energy of the fractional harmonics exceeds an energy of the fundamental by a predetermined factor.

21. An apparatus in accordance with claim 20 wherein said means for sensing acceleration comprises means for measuring engine angular acceleration correesponding to an angular displacement of said running engine.

22. An apparatus in accordance with claim 21 wherein said acceleration analyzing means for analyzing the provided signal on the basis of the engine speed has a fixed frequency response and a sampling rate for analyzing the provided signal responsive to engine speed.

23. A method for detecting a misfire condition by interpreting acceleration of a running engine comprising the steps of:
measuring an acceleration of said running engine, wherein the acceleration is indicative of said running engine's performance, and for providing a composite signal representative of said acceleration;
spectrally discriminating the composite signal provided in said step of measuring, and for providing a normal firing signal corresponding to spectral energy attributable to a portion of the composite signal representative of a normal firing condition in said running engine, and, concurrent to the provision of the normal firing signal, for providing a misfire signal, corresponding to spectral energy attributable to another portion of the composite signal representative of a misfiring condition in said running engine; and
comparing the normal firing signal and the misfire signal, both signals provided in said step of measuring, and for providing a misfire indication when a magnitude of the misfire signal exceeds a magnitude of the normal firing signal.

24. A method in accordance with claim 23 wherein said step of measuring acceleration comprises a step of measuring engine angular acceleration corresponding to an angular displacement of said running engine.

25. A method in accordance with claim 24 further comprising a step of shutting off fuel to a cylinder, responsive to the step of providing a misfire indication.

26. A method in accordance with claim 23 wherein said step of measuring acceleration comprises a step of measuring acceleration corresponding to a vibration of said running engine.

27. A method in accordance with claim 23 wherein said step of measuring acceleration comprises a step of measuring an in-cylinder combustion phenomena dependent on an acceleration behavior of said running engine.

28. A method for detecting a misfire condition by interpreting acceleration of a running engine comprising the steps of:
non-audio acceleration sensing said running engine, and providing an acceleration signal representative of said acceleration of said running engine;
sensing a speed of said running engine and providing a synchronization signal representative of said running engine's speed;
firing spectral filtering, tuned responsive to the synchronization signal provided by said speed sensing means, the spectral signal provided from said step of non-audio acceleration sensing, and providing a firing signal representative of a firing portion of the spectral signal;

misfire spectral filtering, tuned responsive to the synchronization signal provided by said speed sensing means, the spectral signal provided from said step of non-audio acceleration sensing, and concurrent to the provision of the firing signal providing a misfiring signal representative of a misfiring portion of the spectral signal; and comparing said firing signal and said misfiring signal and providing an indication of a misfire condition when a magnitude of the misfire signal exceeds a magnitude of the firing signal.

29. An apparatus for detecting a misfire condition by interpreting spectral activity of a running engine comprising:

means for measuring a characteristic, indicative of performance of a combustion process of said running engine, and for providing a composite spectral signal representative of the performance of said combustion process;

noise spectral discrimination means for receiving the composite spectral signal provided by said means for measuring a characteristic, and for providing a noise filtered signal absent of a predetermined noise component of the composite spectral signal;

spectral discrimination means for receiving the noise filtered signal provided by said noise spectral discrimination means, and for providing a normal firing signal, corresponding to spectral energy attributable to a portion of the composite signal representative of a normal firing condition in said running engine, and for providing a misfire signal, corresponding to spectral energy attributable to another portion of the composite signal representative of a misfiring condition in said running engine; and means for providing an indication of a misfire condition when a magnitude of the misfire signal exceeds a magnitude of the firing signal by a predetermined factor.

30. A device in accordance with claim 29 wherein said characteristic is associated with an acceleration effect corresponding to the combustion process of said running engine.

31. A device in accordance with claim 29 wherein said spectral discrimination means comprises a digital filter with fixed filter coefficients and a sampling rate responsive to engine speed.

32. A device in accordance with claim 29 wherein said spectral discrimination means comprises a digital filter with a fixed data rate and variable filter coefficients corresponding to engine speed.

* * * * *